Dec. 4, 1973   J. R. LEBLOND   3,776,999

METHOD OF TIRE SHAPING AND VULCANIZING

Filed Sept. 15, 1971   5 Sheets-Sheet 1

INVENTOR.
JEAN P. LEBLOND
BY
Charles A. Blank
ATTORNEY

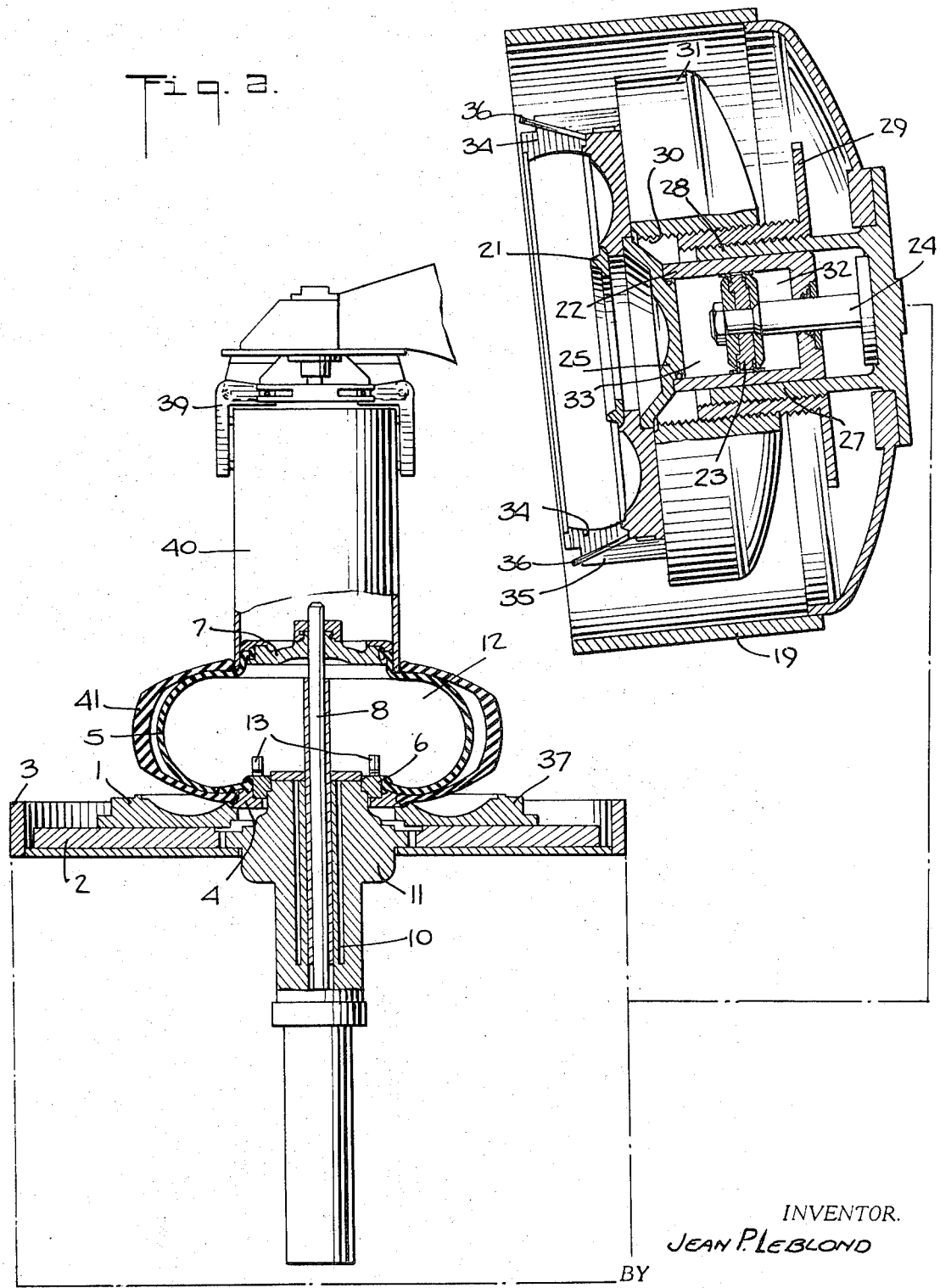

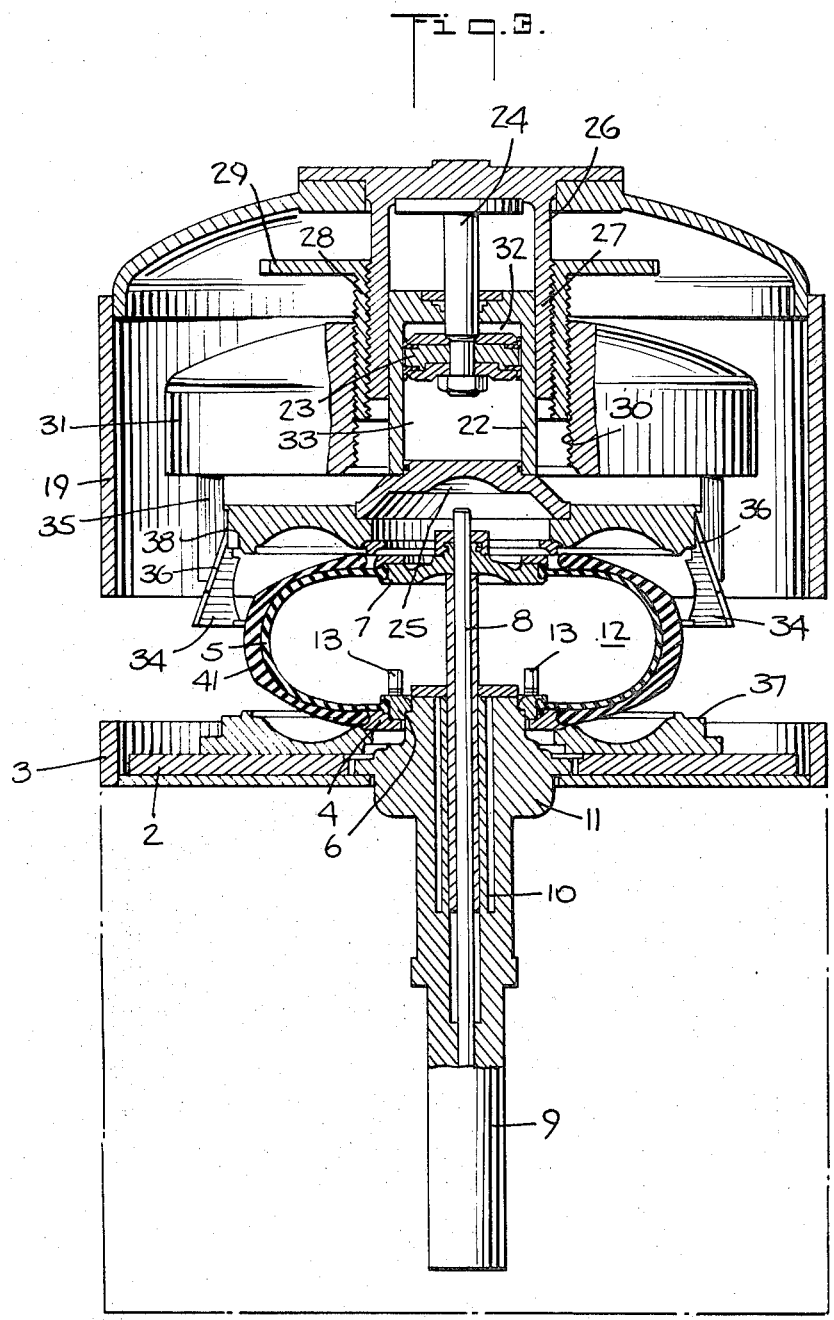

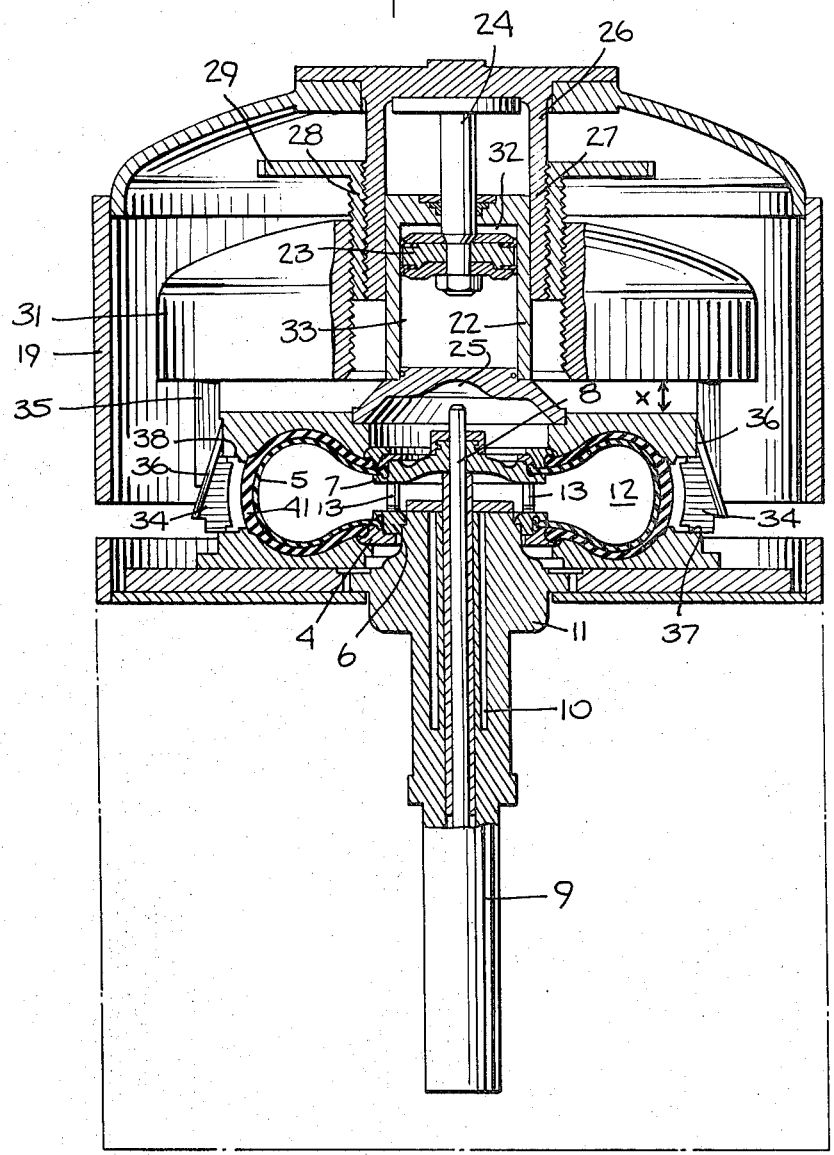

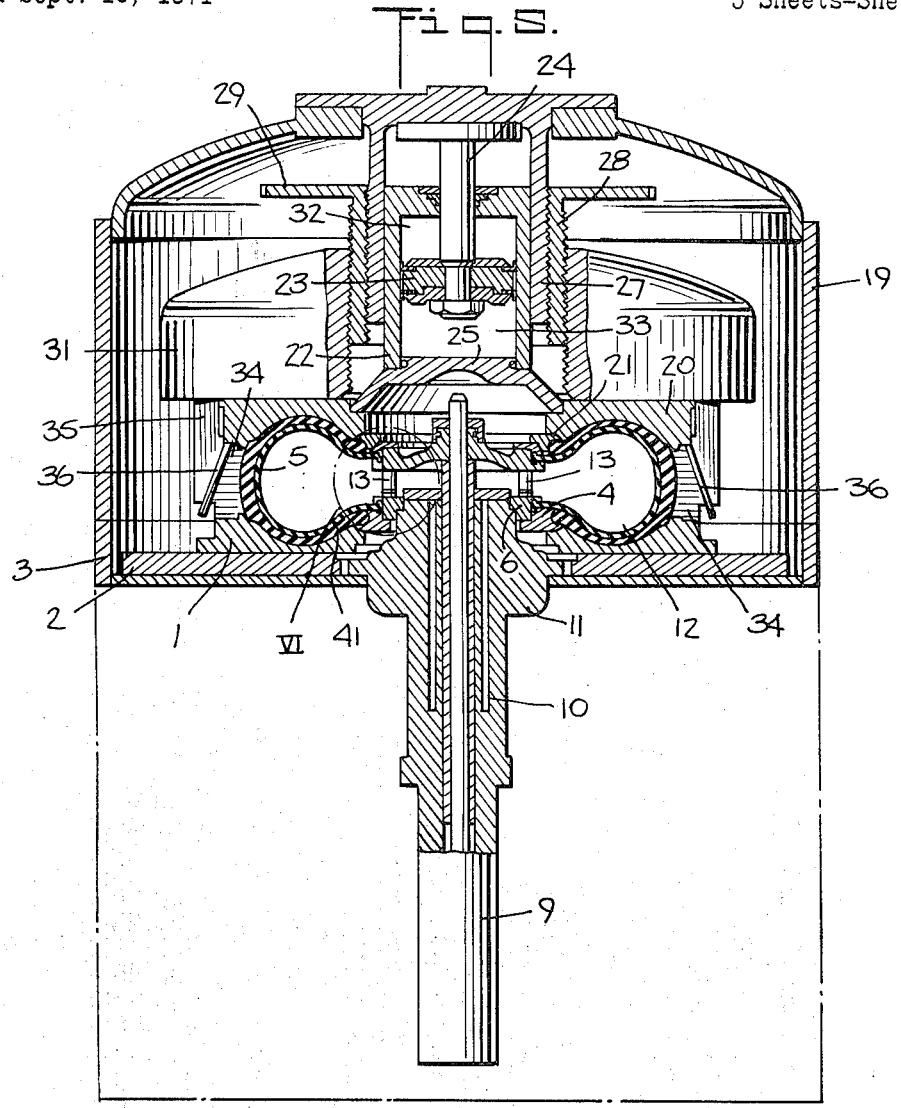
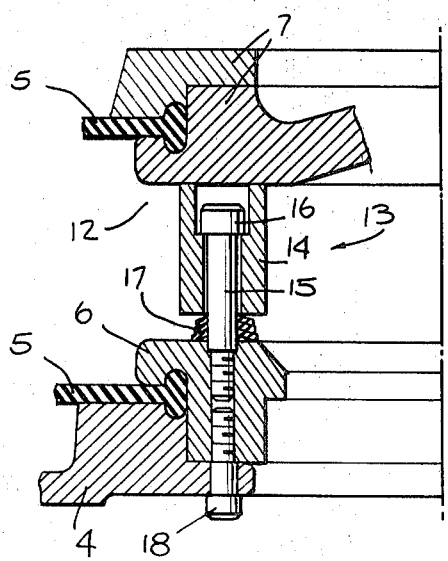

United States Patent Office 3,776,999
Patented Dec. 4, 1973

3,776,999
METHOD OF TIRE SHAPING AND VULCANIZING
Jean R. Leblond, Compiegne, France, assignor to Uniroyal Societe Anonyme, Neuilly-sur-Seine, France
Filed Sept. 15, 1971, Ser. No. 180,591
Claims priority, application France, Sept. 21, 1970, 7034111
Int. Cl. B29n 5/02
U.S. Cl. 264—315                    6 Claims

ABSTRACT OF THE DISCLOSURE

Improvements in a tire shaping and vulcanizing method to enable use of a press with tread molding segments avoiding distortion of the tire. A movable mold section is applied to the tire with sufficient force to position the movable mold section coaxially in place on the tire prior to complete closure of the mold. Compressible stops restrain the travel of the movable mold section to maintain space for movement of the tread molding segments until complete closure of the mold.

---

The present invention relates to improvements in a molding process for pneumatic tires on a shaping and vulcanization press as well as to improvements in such a press.

Presses are known which in accordance with the so-called Soderquist system combine shaping and vulcanization of a previously formed pneumatic tire in one operation, and function with an individual heating vessel. Such a press, known commercially under the trademark "Bag-O-Matic," is described and represented, for example, in French Patent No. 1,386,801 of the McNeil Machine and Engineering Company. This press comprises a vulcanization mold containing a lower mold section mounted on a lower fixed plate and an upper mold section attached to cover forming a movable dome, the cover and the lower plate constituting the heating vessel. In certain systems, it is the lower part that is movable. The upper mold section is coaxially aligned with a hollow cylindrical element slidably mounted in a cylindrical guide dome casing attached to the dome and to an upper movable plate of the press. This upper mold section can descend under the action of its own weight, possibly assisted by pressurized fluid jacks having a cylinder and control piston for a relative shifting of the upper mold section with respect to the upper plate so that the upper mold section can move away from the plate to a limited extent. At the end of the descent of the dome and of the upper mold section, the upper mold section enters into contact with a stoppage device attached to the lower plate. Finally, the mold consists of a series of peripheral lateral tread molding segments situated between the upper and lower mold sections, respectively. These are radially movable by cooperation with respective oblique guides, inclined from top to bottom and towards the exterior and attached to a segment-holder ring of the upper plate. The tread-molding segments are capable of sliding radially between the surfaces or corresponding guiding spans of the upper and lower mold sections.

The present adapttions of known presses of this type have various disadvantages. Since the upper mold section is applied by its own weight at the beginning of the mold-closing operation, its position is not controlled and, for example, when the inflation pressure is applied in the pneumatic tire, the upper mold section moves and does not resume its correct position until complete closure of the mold. As a result, there is a distortion of the tire due to application of the tread molding segments before the correctly positioned application of the upper mold section against the tire. If the upper mold section is correctly applied in its final position against the tire at the beginning of closure of the mold, however, the closure force of the mold is too great and may cause a wedging of the tread molding segments, and thus a poor closure of the mold.

It is an object of the present invention, therefore, to provide a new and improved method of shaping and vulcanizing a tire which avoids one or more of the above-mentioned disadvantages of prior such method.

It is another object of the invention to provide a new improvement in the method of shaping and vulcanizing a tire which eliminates distortion of the tire during molding in an expansible mold.

In accordance with the invention, in a tire shaping and vulcanizing press having supporting means for a stationary mold section, supporting means for a movable mold section, and supporting means for tread molding segments, and a cover displaceable relative to the supporting means for the stationary mold section, the supporting means for the tread molding segments being displaceable toward the stationary mold section for guiding and radially displacing the tread molding segments into position relative to the movable and stationary mold sections upon closure of the mold, the improvement comprises pressurized cylinder and piston means attached to the cover and to the movable mold section and to the supporting means for the tread molding segments for applying the movable mold section to the tire with a sufficient force to maintain the movable mold section coaxially in place on the tire relative to the stationary mold section prior to complete closure of the mold, and at least one compressible stop for limiting the travel of the movable mold section toward the stationary mold section to maintain space for radial movement of the tread molding segments until complete closure of the mold.

Apparatus in accordance with the invention are advantageous due to their great simplicity and thus to their economical fabrication, and their reduced maintenance and surveillance requirements.

For a better understanding of the present invention, together with other and further objects thereof, reference is made to the following description, taken in connection with the accompanying drawings, and its scope will be pointed out in the appended claims.

Referring now to the drawings: FIG. 1 is a fragmentary view in elevation, partially in cross section, of a shaping and vulcanization press, in particular of the so-called "Bag-O-Matic" type, provided with improved apparatus in accordance with the invention. The press is shown in an open configuration with its upper dome tipped over on the side and with an apparatus for the handling of pneumatic tires placed above the lower plate of the press. This supports, in an elevated position, a preformed tire that is to be brought over and set in place on the press for purposes of shaping and vulcanization.

FIG. 2 is a view similar to the preceding, but represents the above-mentioned handling apparatus in a lowered position with the above-mentioned tire arranged on the lower section of the mold, showing an inflatable bladder that has been inserted and that is in the course of being inflated in the tire.

FIG. 3 is a similar view, but shows the upper dome coaxially above the tire, with the tread molding segments of the peripheral mold positioned radially towards the exterior.

Figure 1:
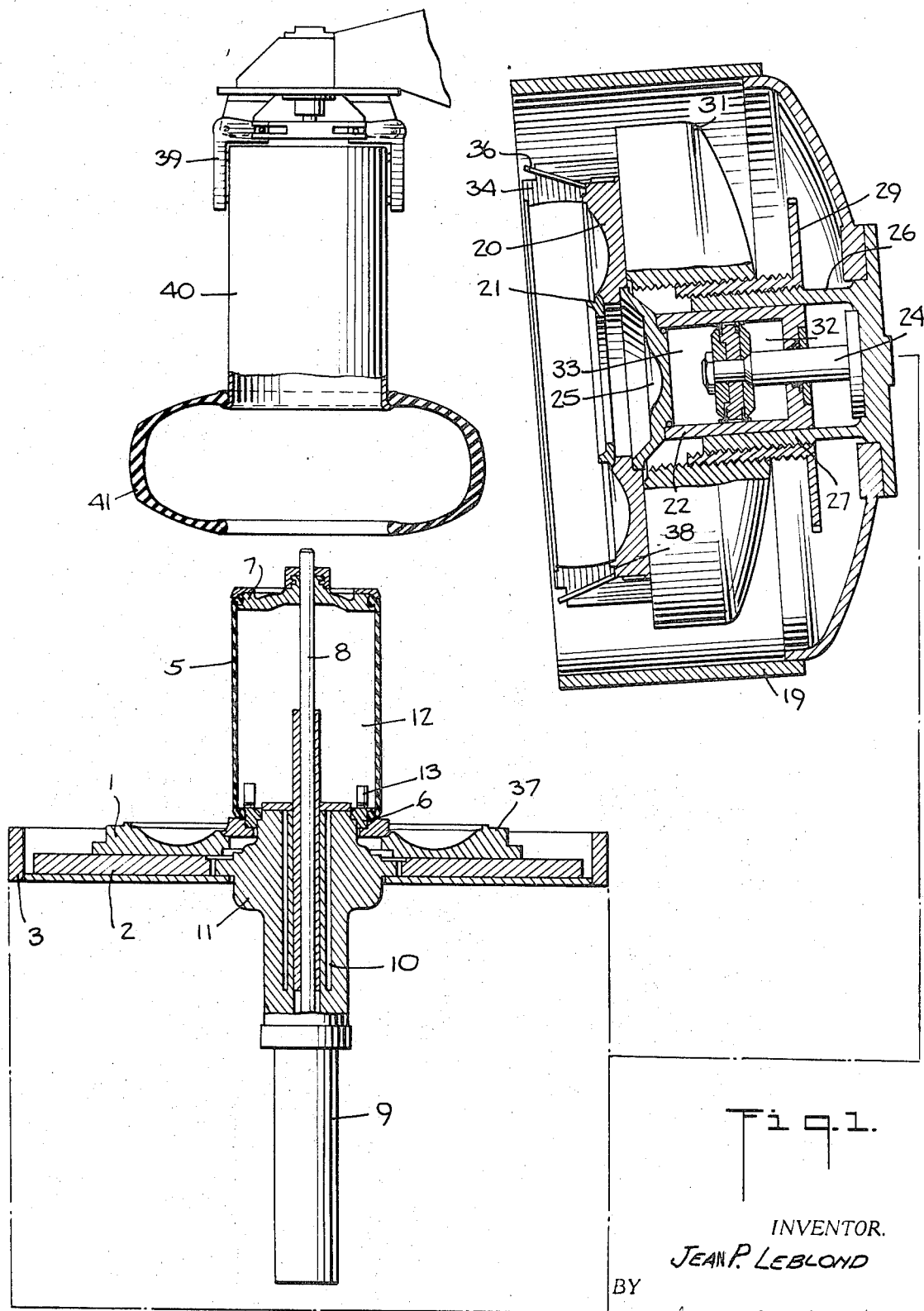

FIG. 4 is a view similar to the preceding, but shows the dome in the course of descent towards the lower plate, with the upper mold section applied against the inflated tire by pressing this tire against the lower mold section and with the tread molding segments of the peripheral mold radially approaching the tire tread by being guided in a sliding fashion between the upper and lower mold sections.

FIG. 5 is a view similar to the preceding, but represents the press in an entirely closed configuration at the end of the descending course of the upper dome, with the tire applied tightly against its external mold.

FIG. 6 is a fragmentary view of the vertical cross-section, to an enlarged scale, of the encircled detail VI of FIG. 5 representing one of the elastic stops at the end of the descending course of the upper mold section.

Referring now more particularly to FIG. 1, the press includes a lower mold section attached to a fixed lower plate 2, mounted in lower element 3 of the heating vessel. Lower mold section 1 is provided, on its radially internal periphery, with an annular heel flange molding device for the tire, forming a vulcanization ring or similar part 4. A deformable bladder 5 with a flexible wall forms an inflatable vessel or similar part having an essentially cylindrical form in the deflated and elongated state. The bladder may, for example, be made of rubber or of a similar material and has its lower end fixed and maintained in a clamped position that is air- and water-tight against ring 4 by a lower annular plate 6 fixed on ring 4, closing the lower end of bladder 5. The upper end of bladder 5 is attached, for example, by clamping or fixing its edge, to an upper movable plate 7 that is coaxially integral with vertical piston rod 8 of a linear pressurized fluid jack whose vertical cylinder 9 has its upper end mounted in the respective central apertures of annular elements 1 to 4 and 6 mentioned above. Meanwhile, lower element 3 of the heating vessel and cylinder 9 are mounted on the framework (not represented) of the press. Jack 8, 9 makes it possible to alternately separate and bring together upper mobile plate 7 and lower fixed plate 6, thus assuring the longitudinal extension of inflatable bladder 5 and the axial contraction of this bladder respectively, allowing the radial expansion of the bladder by inflation. In order to achieve such an objective, one or several appropriate ducts 10, provided in central hub 11, lead to internal space 12 of the closed chamber laterally bounded by bladder 5.

At least one and preferably a plurality of compressible stops or elastic stoppage devices 13 are provided in order to restrain the course of upper movable plate 7 upon its descending movement. These devices are preferably placed inside inflatable bladder 5 and are attached, for example, on ring or fixed lower annular plate 6 towards the periphery of this plate. Referring to FIG. 6 of the drawings, each elastic stop 13 mentioned above preferably contains a sleeve 14 or a similar part mounted in a freely sliding fashion on a vertical axis of a supported shoulder screw or similar part 15 which is screwed at its lower end into fixed lower annular plate 6 through the central bore of sleeve 14. The screw 15 is provided, on its upper end, with a radially projecting head 16 designed to cooperate with an internal shoulder corresponding to the bore of sleeve 14, thus constituting a stop with respect to any ascent of sleeve 14. A compression spring 17, which preferably is relatively rigid, is placed between sleeve 14 and lower fixed annular plate 6. This spring is made, for example, of a bundle of spring steel elastic superimposed washers, which are preferably of small flexibility and which coaxially surround screw 15. Movable upper plate 7 is designed to enter directly into contact with the upper end of sleeve 14 of each elastic stop 13. FIG. 6 shows that fixed annular plate 6 is attached to ring 4 by means of a screw or similar part 18. In addition, FIG. 6 shows in detail the method of positioning, fitting in and tightening of the respective opposite ends of inflatable bladder 5.

Referring again to FIG. 1, the dome or upper cover 19, constituting the upper element of the heating vessel, whose tipping and movement control mechanism is conventional and is represented by broken line, contains the upper section 20 of the shaping and vulcanization mold. This is provided, coaxially and at its radially internal periphery, with a shaping and vulcanization ring or rim 21 for the tire heel. Pieces 20 and 21 are hollowed out centrally in order to make it possible for the upper protruding part of mobile upper plate 7 to be freely enclosed and in order to make it possible for the extremity of piston rod 8 to be freely enclosed in the position where the mold is closed. Upper mold section 20 is connected by a central hub portion 25 to the axially movable cylinder 22 of a pressurized fluid jack, for example a pneumatic or hydraulic jack with a fixed piston 23 whose piston rod 24, is attached to the peak of dome 19. The rod 24 is basically vertical in a closed configuration with respect to the heating vessel. The hub portion 25 blocks off, in an air- and water-tight fashion, the adjacent and corresponding end of movable cylinder 22. Forced guiding of axial or longitudinal translation of movable cylinder 22 is assured externally, for example, by the internal wall surface of a cylindrical ferrule 26. This forms a sort of hollow inverted casing, whose external end is integral with the peak of the dome and in which movable cylinder 22 is mounted in a sliding fashion. An external guiding with sliding of this type provides a great deal of precision in the positioning of cylinder 22.

The external lateral surface of ferrule 26 is externally threaded in region 27, thus forming a sort of hollow screw. Piece 26 is screwed in a tubular member 28, which forms a screw and is internally and externally threaded and is coaxially integral with a cogged rim or wheel or similar part 29. Member 28 is screwed in threaded bore 30 of upper plate 31 of the press, which is thus connected to upper dome 19. Screw member 28, which is externally and internally threaded, can thus be driven in relative rotation by means of cogged wheel 29. Thus, it is possible to obtain a variable adjustment of the relative position of upper plate 31 for various thicknesses of lower mold section 1 and upper mold section 20.

Jack 22, 23, 24 is preferably double-acting, and its piston 23 separates two compartments or working chambers 32, 33 having variable volumes, which are capable of being selectively and alternately connected to a source of pressurized fluid. The above jack thus makes possible, when desired, a relative movement of upper mold section 20 with respect to upper plate 31, permitting it to be lowered in order to separate it from the upper plate and permitting it to be raised in order to bring it into contact with the upper plate.

The molding of the tire tread is assured by lateral peripheral molding segments 34 supported by segment-holder 35 attached to upper plate 31. Molding segments 34 are connected to segment-holder rim 35 by means of oblique guide slides 36. These are arranged in planes passing through the central axis of the mold and inclined from top to bottom and towards the exterior, thus conferring upon segments 34 a relative mobility in a radial direction. In the closed configuration of the heating vessel, segments 35 are situated between lower mold section 1 and upper mold section 20 respectively, through which they are guided during the course of their radial translation movement by guiding surfaces or spans 37 and 38. These are provided, respectively, on the above-mentioned mold sections and cooperate via a sliding contact with the surfaces on segments 34.

Considering now the operation of the press with reference to FIG. 1, in the initial open configuration of the press, upper heating vessel element 19 in the form of a dome is tipped over on its side and inflatable bladder 5 is stretched longitudinally towards the top by means of piston rod 8 and upper plate 7 so as to assume an essentially vertical cylindrical shape. Using a handling or appropriate transportation device consisting of for example, a pair of tongs with claws or grappling hooks 39 and a hooking and lifting device 40, which hooks the radially internal circular edge of a preformed pneumatic tire 41, tire 41 is positioned coaxially over the lower mold 1 and inflatable bladder 5 in order to load the tire onto the press. Chamber 32 of jack 22, 23, 24 in dome 19 is placed under pressure by the introduction of a pressurized fluid, which causes a relative displacement of movable cylinder 22 so as to apply upper mold section 20 against upper plate 31.

During the following operation as represented in FIG. 2, carcass 41 descends and is placed on lower mold section 1. Upper plate 7 descends by the retraction of rod 8 downward and inflatable bladder 5 is inflated according to the usual process by the admission of a pressurized fluid, for example compressed air or water in internal space 12 via ducts 10. This causes the radial expansion of bladder 5 inside tire 41. Handling apparatus 39, 40 is then unhooked or detached from carcass 41 and separated from the press.

Then, as represented in FIG. 3, the apparatus of dome 19 is moved coaxially above carcass 41 and the chamber 33 is pressurized. This has the effect of causing the descent of the cylinder 22 jointly with upper mold section 20 supported by the latter, in order to separate the upper mold section 20 from upper plate 31 and thus to push segments 34 downwards by cooperating in contact with span 38 of mold section 20, in such a way as to place segments 34 in a radially separated position. Thus, the apparatus of upper dome 19 is made to descend towards lower plate 2.

During the course of the following operating phase as represented in FIG. 4, the closing of the mold begins by application of upper mold section 20 to the upper side of tire 41, via the pressure in chamber 33 of cylinder 22. This upper mold section 20 is thus applied indirectly against lower plate 2 by the force exerted via the above-mentioned jack 22, 23, 24. Rim or ring 21 of upper mold section 20 is therefore pressed against upper plate 7, pushing this plate 7 downwardly until it comes into contact with elastic stops 13. These stops 13 restrain the descending course of mold section 20 by means of the opposing action of elastic washers 17 (see FIG. 6).

The fluid pressure in working chamber 33 of cylinder 22 must thus be such, that the force exerted on upper mold section 20 is sufficient to maintain this mold section 20 correctly in place despite the counterpressure reaction opposed by inflated tire 41, but nevertheless insufficient to cause complete bending or total compression of elastic washers 17. This pressure, for example, will cause a compression upon a bending of 0.5 millimeter of the elastic washers 17. The complementary or remaining part of the maximum possible compression of elastic washers 17, which part is, for example, several tenths of a millimeter, thus represents the remaining play preserved between the upper mold section 20 and lower mold section 1 respectively, designed to facilitate the radial translation sliding movement of segments 34.

When upper dome 19 is lowered even more, the above-mentioned play permits an easy sliding of segments 34 between the above-mentioned mold sections. The separation distance "X" between upper plate 31 and upper mold section 20 diminishes, thus causing an axial descending movement of segment-holder rim 35 and consequently a radial translation movement of segments 34 towards the interior.

FIG, 5 shows the press in a completely closed configuration, and it is not until the mold finishes closing that upper plate 31 comes into contact with upper mold section 20. Upper dome 19 is thus applied against lower wall 3 of the heating vessel and the entire closing force of the mold resulting from increased pressure in chamber 33 is utilized to completely eliminate the clearance between mold sections 1 and 20 respectively on the one hand and segments 34 on the other hand. As a result, these segments 34 are tightly applied to the tread of the tire 41. Elastic washers 17 of stops 13 are thus bent or compressed to a maximum. The mold and the heating vessel are closed completely and the vulcanization operation can then begin.

While there has been described what is at present considered to be a preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. In the method of shaping and vulcanizing a tire between a movable mold section providing an upper mold surface and a stationary mold section providing a lower mold surface on which a tire is disposed and radially displaceable tread molding segments which includes inflating an inflatable member positioned inside the tire, the improvement comprising the steps of:

applying the movable mold section to the tire with a sufficient force to maintain the movable mold section coaxially in place on the tire relative to the stationary mold section prior to complete closure of the mold;

restraining the travel of the movable mold section to maintain a vertical clearance between the upper mold surface of the movable mold section and the tread molding segments;

sliding the tread molding segments toward the tread of the tire and between the upper and lower surfaces of the mold sections;

and then completely closing the mold by applying the movable mold section to the tire with a sufficient force to eliminate the clearance betwen the movable mold section and the tread molding segments.

2. In the method in accordance with claim 1, the improvement in which the step of restraining the travel of the movable mold section to maintain a vertical clearance between the upper mold surface of the movable mold section and the tread molding segments comprises partially compressing at least one compressible stop between mold sections.

3. In the method of shaping and vulcanizing a tire in a press having supporting means for a stationary mold section providing a lower mold surface on which a tire is disposed, supporting means for a movable mold section providing a movable mold surface, supporting means for tread molding segments, and a cover displaceable relative to the supporting means for the stationary mold section, the supporting means for the tread molding segments being displaceable toward the stationary mold section for guiding and radially displacing the tread molding segments into position relative to the movable and stationary mold sections upon closure of the mold, said press having at least one compressible stop between the supporting means for the mold sections and having cylinder and piston means attached to the cover and to the movable mold section and to the supporting means for the tread molding segments, the method including inflating an inflatable member positioned inside the tire, the improvement comprising:

pressurizing the cylinder and piston means for applying the movable mold section to the tire with a sufficient force to maintain the movable mold section coaxially in place on the tire relative to the stationary mold section prior to complete closure of the mold;

partially compressing the compressible stop for restraining the travel of the movable mold section toward the stationary mold section to maintain a vertical clearance between the upper mold surface of the movable mold section and the tread molding segments for radial movement of the tread molding segments until complete closure of the mold;

sliding the tread molding segments toward the tread of the tire and between the upper and lower surfaces of the mold sections;

and then completely closing the mold by applying the movable mold section to the tire with a sufficient force to eliminate the clearance between the movable mold section and the tread molding segments.

4. The method of shaping and vulcanizing a tire between a movable mold section providing an upper mold surface and a stationary mold section providing a lower mold surface on which a tire is disposed and radially displaceable tread molding segments comprising:

inflating an inflatable member positioned inside the tire;

applying the movable mold section to the tire with a sufficient force to maintain the movable mold section coaxially in place on the tire relative to the stationary mold section prior to complete closure of the mold;

restraining the travel of the movable mold section to maintain a vertical clearance between the upper mold surface of the movable mold section and the tread molding segments;

sliding the tread molding segments toward the tread of the tire and between the upper and lower surfaces of the mold sections;

then completely closing the mold by applying the movable mold section to the tire with a sufficient force to eliminate the clearance between the movable mold section and the tread molding segments;

and vulcanizing the tire.

5. The method in accordance with claim 4 in which the step of restraining the travel of the movable mold section to maintain a clearance between the upper mold surface of the movable mold section and the tread molding segments comprises partially compressing at least one compressible stop between mold sections.

6. The method of shaping and vulcanizing a tire in a press having supporting means for a stationary mold section providing a lower mold surface on which a tire is disposed, supporting means for a movable mold section providing an upper mold surface, supporting means for tread molding segments, and a cover displaceable relative to the supporting means for the stationary mold section, the supporting means for the tread molding segments being displaceable toward the stationary mold section for guiding and radially displacing the tread molding segments into position relative to the movable and stationary mold sections upon closure of the mold, said press having at least one compressible stop between the supporting means for the mold sections and having cylinder and piston means attached to the cover and to the movable mold section and to the supporting means for the tread molding segments, comprising:

inflating an inflatable member positioned inside the tire;

pressurizing the cylinder and piston means for applying the movable mold section to the tire with a sufficient force to maintain the movable mold section coaxially in place on the tire relative to the stationary mold section prior to complete closure of the mold;

partially compressing the compressible stop for restraining the travel of the movable mold section toward the stationary mold section to maintain a vertical clearance between the movable mold section and the tread molding segments for radial movement of the tread molding segments until complete closure of the mold;

sliding the tread molding segments toward the tread of the tire and between the upper and lower surfaces of the mold sections;

then completely closing the mold by applying the movable mold section to the tire with a sufficient force to eliminate the clearance between the movable mold section and the tread molding segments;

and vulcanizing the tire.

References Cited

UNITED STATES PATENTS

| 3,458,612 | 7/1969 | Pacciarini et al. | 264—315 X |
| 3,396,221 | 8/1968 | Balle et al. | 264—315 |

ROBERT F. WHITE, Primary Examiner

J. H. SILBAUGH, Assistant Examiner

U.S. Cl. X.R.

425—46

PO-1050
(5/69)

UNITED STATES PATENT OFFICE
CERTIFICATE OF CORRECTION

Patent No. 3,776,999                    Dated December 4, 1973

Inventor(s) Jean R. Leblond

It is certified that error appears in the above-identified patent and that said Letters Patent are hereby corrected as shown below:

column 6 line 34 before "in which" read --in accordance with claim 1--

Signed and sealed this 6th day of August 1974.

(SEAL)
Attest:

McCOY M. GIBSON, JR.                    C. MARSHALL DANN
Attesting Officer                        Commissioner of Patents